Patented Sept. 16, 1941

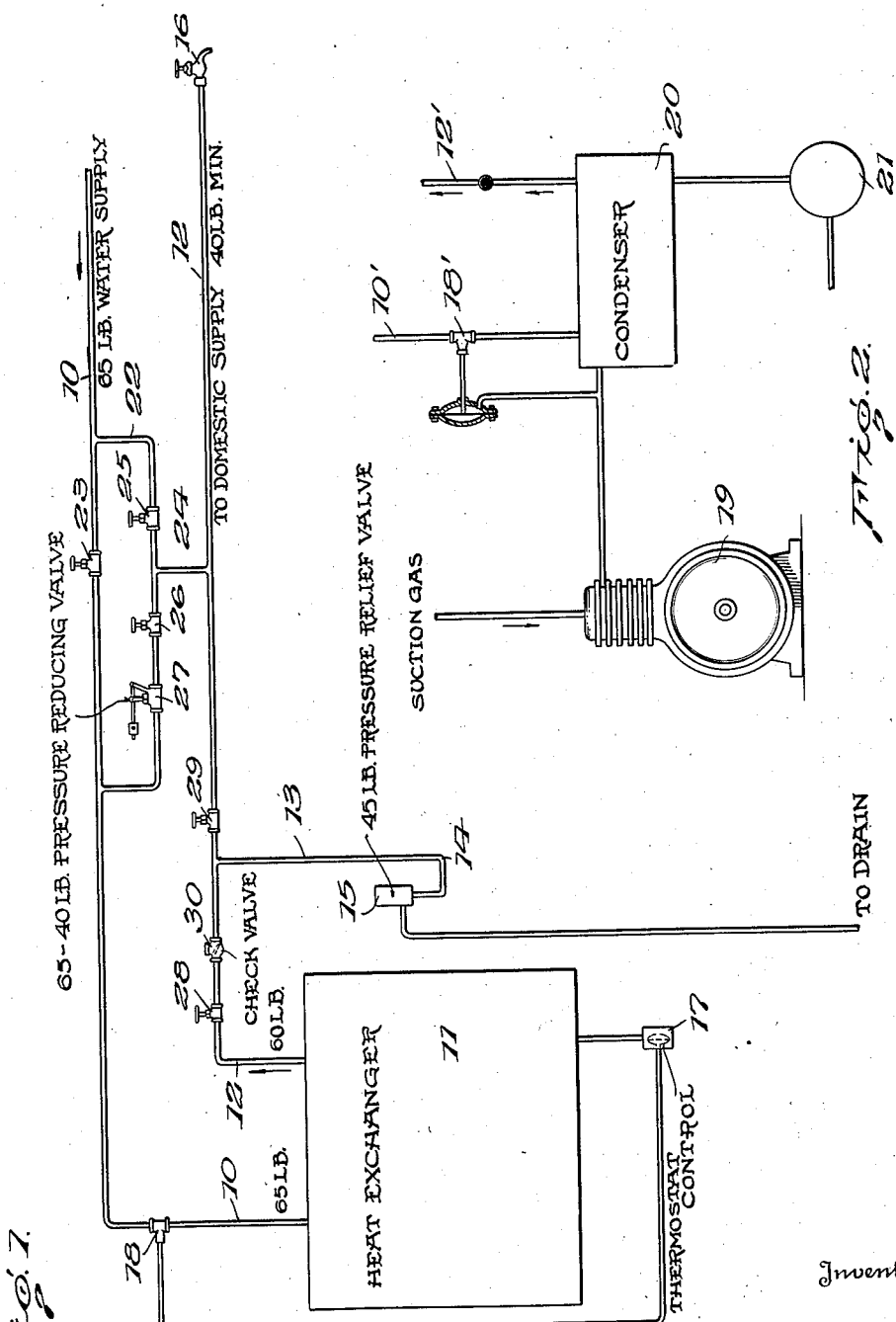

2,255,967

UNITED STATES PATENT OFFICE 2,255,967

COMBINED HEAT EXCHANGE AND DOMESTIC WATER SUPPLY SYSTEM

John W. Collins, Toronto, Ontario, Canada, assignor to The Trane Company, La Crosse, Wis., a corporation of Wisconsin Application June 27, 1938, Serial No. 216,185

2 Claims. (Cl. 62—3)

This invention relates to a system for supplying water from city mains to unit coolers, condensers or other types of heat exchangers and for subsequently utilizing the water for domestic purposes as occasion requires, thereby minimizing waste and reducing operating expense.

It has heretofore been a common practice to extract heat from air which is circulated for cooling purposes, or from other fluids, as for example a refrigerating medium, by drawing water in a continuous stream from the city mains to a heat exchanger and then discharging it as waste to a sewer. Although the practice is wasteful and expensive it has been resorted to in many localities and especially in domestic installations where a cooling tower for a recirculated body of water would be an unsightly addition to a house and the power cost of operating recirculating apparatus would be relatively high as compared to the cost of water. Notwithstanding this, however, the continuous circulation and discharge of water is a contributing factor in the expense of operating such cooling systems.

It is an object which is achieved by this invention to minimize the waste of water in such systems and consequently to reduce the cost by utilizing the water for domestic supply as well as for heat exchange.

Another object is to provide a system wherein water flows continuously from a source of supply through a heat exchanger and into the domestic supply lines, only so much of it being discharged to waste as is in excess of domestic requirements.

Still another object is to provide a system wherein water under city main pressure is used in a heat exchanger and is then delivered to the domestic supply under suitably reduced pressure for use when required.

A further object is to provide a system wherein water from a city main is conducted through a heat exchange and is then piped to the domestic supply lines, with a line to drain which is controlled by a pressure relief valve, to open under a pressure substantially in excess of that desired for domestic supply, but to close when the domestic supply is drawn upon.

A still further object is to provide a system wherein water is supplied from city mains to a heat exchanger under the control of a modulating valve which is automatically regulated according to the temperature of the space to be cooled, the temperature of the condensing medium, or the head pressure of a refrigerating system.

Other and further objects will be apparent from the following description and drawing, in which Figure 1 is a schematic view showing a system embodying the features of this invention.

Figure 2 is a fragmentary schematic view showing a modified form of modulating valve control which is responsive to pressure variations for controlling the flow of cooling water to the condenser of a refrigerating system.

With further reference to the drawing, the legends show typical pressures in a domestic installation, but it is to be understood that these are given only by way of example and will be different under various conditions.

A water supply line 10 which connects with the city mains carries water under, say, 65 pounds pressure to a heat exchanger which is shown generally at 11. The heat exchanger may take any of the various forms of apparatus which utilize water for extracting sensible heat from another fluid, such as, for example, the air cooling coils of an air conditioning system, or the condenser of a refrigerating apparatus.

At the outlet 12 of the exchanger the water emerges under somewhat less pressure but in excess of that necessary for an adequate supply for domestic use. In the drawing, the legends show that the inlet pressure is 65 pounds while that at the outlet is 60 pounds, the domestic supply requiring a minimum pressure of 40 pounds.

A branch line 13 communicates with the outlet line 12 and leads to waste. It is formed with a trap 14 which will retain a quantity of water as a seal and it has mounted therein a pressure relief valve 15 which is set to open at a desired pressure, in this case 45 pounds. Thus, when water is drawn for domestic use the pressure relief valve 15 will close, but when the faucets 16 are shut off the increase of pressure in the discharge line 12 to over 45 pounds will cause the valve to open and the water which has passed through the exchanger will thereupon be discharged to waste.

A thermostat 17 which responds to temperature changes in the space to be cooled, or which as shown is responsive to the temperature of the condensing medium, controls the operation of a modulating valve 18 in the inlet line 10 and thereby regulates the supply of cold water to the apparatus.

As is shown in Figure 2 the modulating valve 18' may be controlled by the head pressure of a compressor 19 in a refrigerating system wherein the water entering through line 10' circulates around a condenser 20 and emerges through line 12′, the compressed refrigerant being thus condensed and passing successively to a receiver 21 and an expander (not shown), and finally returning to the compressor in a continuous cycle of operation.

Again referring to Figure 1, the inlet line 10 is preferably controlled so that water may flow only to domestic supply, or only through the exchanger, and provision is also necessarily made for shutting down the entire system when required. To this end the supply line 10 has a by-pass 22 around a stop valve 23, the by-pass communicating directly with the domestic supply line 12, as at 24. Valves 25 and 26 are positioned at either side of the branch 24, and the by-pass line also has a pressure reducing valve 27 which in this case reduces inlet supply pressure from 65 to 40 pounds.

In normally operating the system to supply water to the exchanger 11 and thence to the faucets 16, valve 23 is opened and the valves 25 and 26 in the by-pass are closed. Thus, water flowing through line 10 and past the modulating valve 18 will enter the heat exchanger 11 and upon emerging therefrom will pass through line 12 to the faucets 16 in the domestic supply system, any excess of water not required for domestic use escaping past the pressure relief valve 15 in line 13 to waste.

To supply water only to the faucets and to cut off flow through the heat exchanger, valves 25 and 28 may be closed, causing the water which cannot now flow through the exchanger to back up through the by-pass 22, pressure reducing valve 27 and open valve 26 into the branch line 24 and thence to the outlet line 12 and domestic supply. The pressure having been reduced to 40 pounds by valve 27, will be insufficient to open valve 15 in the drain line 13.

If water is to be supplied to the domestic supply without substantial diminution of pressure this may be accomplished by opening valve 25 and closing valves 23, 26 and 29 whereupon flow will be established directly from the mains to by-pass 22, branch 24 and outlet line 12. Ordinarily, however, the pressure would be desirably reduced to the value at which the relief valve 15 responds. To accomplish this the valve 29 is left open, and water is prevented from flowing back through the exchanger by the check valve 30, assuming that it could otherwise do so because valve 28 was left open.

To cut off the domestic supply while continuing to use the heat exchanger valves 23 and 28 are opened while valves 25, 26 and 29 are closed.

When it is desired to shut down the entire system the valves 23 and 25 are closed and the supply from the mains is thereby cut off both from the heat exchanger and the domestic supply.

From the foregoing it will be apparent that this system provides a variety of controls for supplying water either to a heat exchanger or to domestic supply, but that it is intended in normal use to furnish a continuous supply of water at city main pressure to a heat exchanger and thereafter to use the water for domestic supply under suitably reduced pressure when and as it is required, with the result that waste of water will be minimized and the heat exchanger can be operated more economically.

What I claim is:

1. A system for supplying water for both heat exchange and domestic use which comprises in combination with a refrigerant compressor and condenser, a line for supplying water to said condenser and a second line from said condenser to a domestic water supply system, a modulating valve for controlling the flow of water to said condenser in accordance with the head pressure of refrigerant, and further valve means for relieving the system of water in excess of domestic requirements while maintaining in said domestic system a supply of water under adequate pressure.

2. A system for supplying water for both heat exchange and domestic use which comprises a water supply line, a heat exchanger and a domestic water supply system normally in communication therewith, a valve for relieving the system of water in excess of domestic requirements upon rise in pressure when the domestic system is not in use, a by-pass line from the water supply line to the domestic supply system, a pressure reducing valve in said last-named line, and a valve for cutting off flow of water through said heat exchanger, the arrangement being such that when said last-named valve is closed water entering through the supply line will flow through said by-pass line past said pressure reducing valve, and into the domestic water supply system for use.

JOHN W. COLLINS.